US012073714B2

(12) United States Patent
Jumonji

(10) Patent No.: US 12,073,714 B2
(45) Date of Patent: Aug. 27, 2024

(54) TRAFFIC JAM INFORMATION PROVIDING DEVICE, TRAFFIC JAM INFORMATION PROCESSING METHOD, AND RECORDING MEDIUM

(71) Applicant: NEC Corporation, Tokyo (JP)

(72) Inventor: Nana Jumonji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 264 days.

(21) Appl. No.: 17/602,388

(22) PCT Filed: Apr. 9, 2020

(86) PCT No.: PCT/JP2020/015988
§ 371 (c)(1),
(2) Date: Oct. 8, 2021

(87) PCT Pub. No.: WO2020/213512
PCT Pub. Date: Oct. 22, 2020

(65) Prior Publication Data

US 2022/0165151 A1 May 26, 2022

(30) Foreign Application Priority Data

Apr. 15, 2019 (JP) ................................ 2019-077226

(51) Int. Cl.
*G08G 1/01* (2006.01)
*G08G 1/052* (2006.01)

(52) U.S. Cl.
CPC .......... *G08G 1/0133* (2013.01); *G08G 1/052* (2013.01)

(58) Field of Classification Search
CPC ........................... G08G 1/0133; G08G 1/052
See application file for complete search history.

(56) References Cited

U.S. PATENT DOCUMENTS 9,415,718 B2 * 8/2016 Futamura ............... B60Q 9/008
2007/0005231 A1 * 1/2007 Seguchi .......... G08G 1/096775
340/933

(Continued)

FOREIGN PATENT DOCUMENTS

JP 2011-189776 A 9/2011
JP 2013-168065 A 8/2013

(Continued)

OTHER PUBLICATIONS

International Search Report for PCT Application No. PCT/JP2020/015988, mailed on Jul. 14, 2020.

(Continued)

*Primary Examiner* — Thomas D Alunkal

(57) ABSTRACT

A traffic-jam information providing device is configured to determine the position of a target object based on first sensing information relating to the position of a target object causing a reduction of speed of a moving object. By reference to second sensing information relating to a moving status of the moving object when the moving object is moving along a path having a plurality of sections, the traffic jam information providing device is configured to calculate traffic jam information in the path which the moving object is moving along based on the second sensing information in a section other than a predetermined section determined with reference to the position of a target object detected based on the first sensing information.

6 Claims, 8 Drawing Sheets

(56) References Cited

U.S. PATENT DOCUMENTS

| | | | | |
|---|---|---|---|---|
| 2013/0314503 | A1* | 11/2013 | Nix | G06V 20/58 348/46 |
| 2016/0284211 | A1* | 9/2016 | Suzuki | G08G 1/0133 |
| 2018/0370526 | A1* | 12/2018 | Ohmura | G06V 20/584 |
| 2019/0144002 | A1* | 5/2019 | Okada | B60W 50/14 340/425.5 |
| 2021/0118296 | A1* | 4/2021 | Ashida | G08G 1/0112 |

FOREIGN PATENT DOCUMENTS

| | | | |
|---|---|---|---|
| JP | 2015-018396 | A | 1/2015 |
| JP | 2016-021177 | A | 2/2016 |
| JP | 2016-184236 | A | 10/2016 |
| JP | 2018-067225 | A | 4/2018 |

OTHER PUBLICATIONS

Japanese Office Action for JP Application No. 2021-514913, mailed on Feb. 21, 2023 with English Translation.

* cited by examiner

TRAFFIC JAM INFORMATION PROVIDING DEVICE, TRAFFIC JAM INFORMATION PROCESSING METHOD, AND RECORDING MEDIUM

This application is a National Stage Entry of PCT/JP2020/015988 filed on Apr. 9, 2020, which claims priority from Japanese Patent Application 2019-077226 filed on Apr. 15, 2019, the contents of all of which are incorporated herein by reference, in their entirety.

TECHNICAL FIELD

Non-limiting embodiments of the present invention relate to a traffic jam information providing device, a traffic jam information processing method, and a recording medium.

BACKGROUND ART

Technology for generating traffic-congestion information based on images captured by in-vehicle cameras as well as the speed and positions of vehicles (or moving objects) travelling on roads has been developed. For example, Patent Document 1 discloses a traffic-congestion prediction device configured to predict the occurrence of traffic congestion based on the speed of a vehicle as well as an inter-vehicular distance between a vehicle and its preceding vehicle by use of a drive-recorder device equipped with a GPS receiver and an in-vehicle camera. Patent Document 2 discloses a traffic-congestion detection system configured to recognize a speed-limit pattern from an image captured by an in-vehicle camera installed in an in-vehicle device mounted on a vehicle, to transmit a position of a vehicle and a difference between a speed limit and current speed of a vehicle to a vehicle traveling management device (or a server), and to detect traffic congestion based on the difference, thus transmitting traffic congestion information to an in-vehicle device.

CITATION LIST

Patent Literature Document

Patent Document 1: Japanese Patent Application Publication No. 2018-67225

Patent Document 2: Japanese Patent Application Publication No. 2015-18396

SUMMARY OF ILLUSTRATIVE EMBODIMENTS

Technical Problem

According to Patent Document 1, the inter-vehicular distance is calculated based on an image captured by an in-vehicle camera and divided by the speed of a vehicle to produce an inter-vehicular time such that a traffic-congestion occurrence prediction and/or a traffic-congestion elimination prediction can be made according to a decision as to whether or not each of the inter-vehicular distance and the inter-vehicular time satisfies a predetermined condition. However, it is difficult to expect a high accuracy of prediction since a congested condition is predicted solely using a drive-recorder device mounted on a vehicle. According to Patent Document 2, traffic congestion is detected when a situation continues for a predetermined time or more such that a difference between a speed limit and current speed of a vehicle becomes equal to or higher than a reference value, and therefore a congested interval of distance will be identified with reference to a road-map database according to the position of a vehicle. However, it is difficult to detect traffic congestion with high accuracy when a small number of vehicles can communicate with a vehicle traveling management device. Due to the existence of signals, railway-crossings, signs or the like on roads, it is necessary to generate the traffic-congestion information reflecting the status of roads. However, the technology of Patent Document 1 is designed to autonomously predict traffic congestion solely using a drive-recorder device mounted on a vehicle, and therefore it is difficult to predict traffic congestion reflecting the status of roads. The technology of Patent Document 2 aims to manage the status of transportation using multiple vehicles under a public transportation carrier using trucks and freight trains, which requires the management cost and the labor and time of a manager since the vehicle traveling management device is installed in an office of a public transportation carrier. For this reason, there is a demand for the development of a technology for providing highly-accurate traffic-congestion information without needing management costs and the time and effort of a manager.

Non-limiting embodiments of the present invention aim to provide a traffic-jam information providing device, a traffic-jam information processing method, and a recording medium, which can solve the aforementioned problems.

Solution to Problem

In a first aspect of non-limiting embodiments of the present invention, a traffic-jam information providing device includes an object determination means configured to determine the position of a target object based on first sensing information relating to the position of a target object causing a reduction of speed of a moving object, and a traffic-jam information calculation means, by reference to second sensing information relating to a moving status of the moving object when the moving object is moving along a path having a plurality of sections, configured to calculate traffic jam information in the path which the moving object is moving along based on the second sensing information in a section other than a predetermined section determined with reference to the position of a target object detected based on the first sensing information.

In a second aspect of non-limiting embodiments of the present invention, a traffic jam information processing method causes a computer to: determine the position of a target object based on first sensing information relating to the position of a target object causing a reduction of speed of a moving object; and by reference to second sensing information relating to a moving status of the moving object when the moving object is moving along a path having a plurality of sections, calculate traffic jam information in the path which the moving object is moving along based on the second sensing information in a section other than a predetermined section determined with reference to the position of a target object detected based on the first sensing information.

In a third aspect of non-limiting embodiments of the present invention, a recording medium is configured to store a program causing a computer to execute: an object determination function to determine the position of a target object based on first sensing information relating to the position of a target object causing a reduction of speed of a moving object, and a traffic jam information calculation function, by reference to second sensing information relating to a moving status of the moving object when the moving object is moving along a path having a plurality of sections, to calculate traffic-jam information in the path which the moving object is moving along based on the second sensing information in a section other than a predetermined section determined with reference to the position of a target object detected based on the first sensing information.

Advantageous Effects

According to non-limiting embodiments of the present invention, it is possible to provide traffic jam information with high accuracy depending on the status of roads without entailing costs and human labor.

DESCRIPTION OF EXEMPLARY EMBODIMENTS

A traffic-jam information providing device and a traffic-jam information processing method according to an exemplary embodiment of the present invention will be described in detail with reference to the accompanying drawings.

Figure 1:
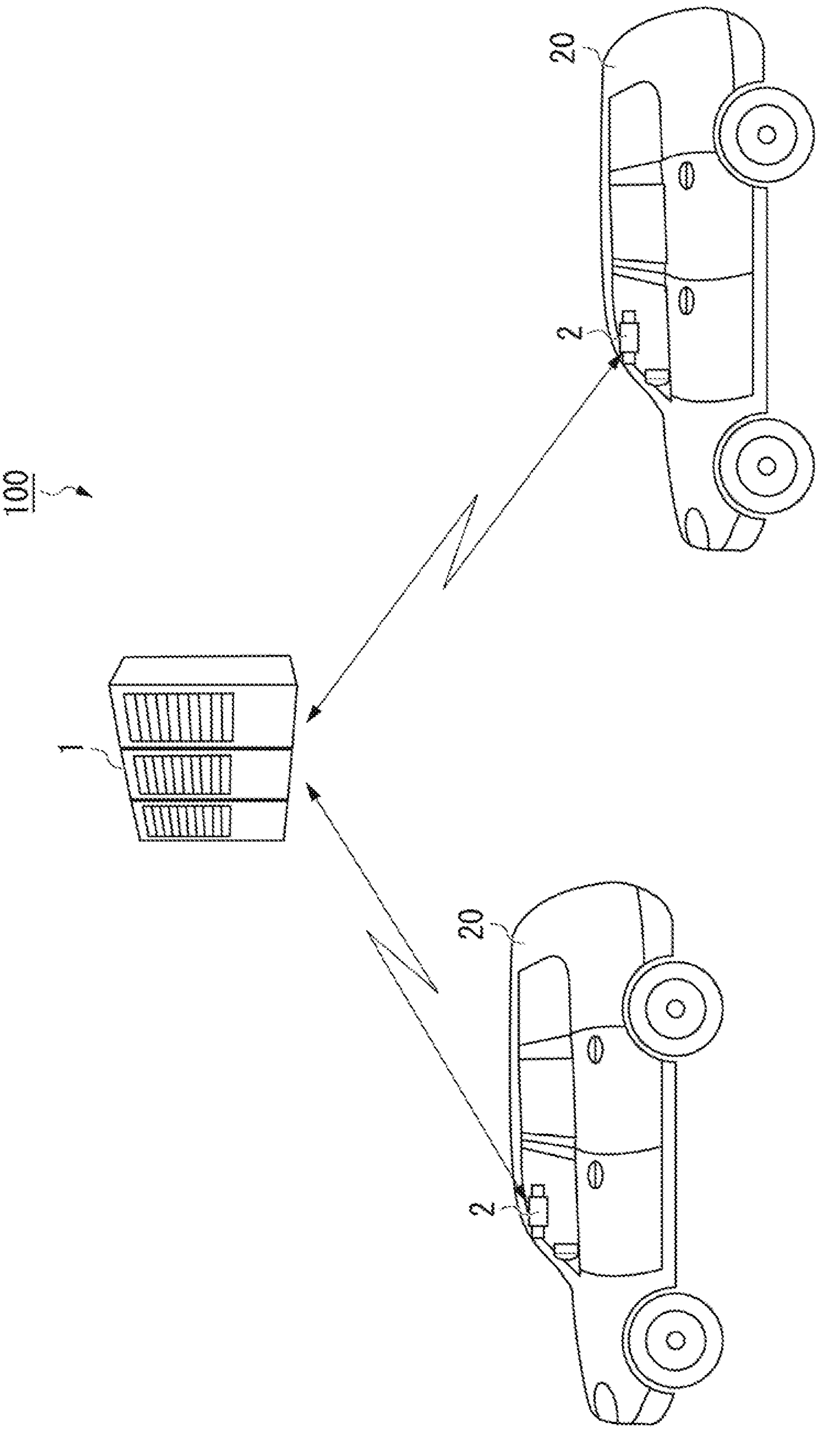
FIG. 1 is a block diagram showing an overview of a traffic-jam information providing system including a traffic jam information providing device according to an exemplary embodiment of the present invention.

FIG. 1 shows the configuration of a traffic-jam information providing system 100 including a traffic jam information providing device 1 according to the exemplary embodiment and drive recorders 2 mounted on vehicles 20. In the traffic jam information providing system 100, the traffic jam information providing device 1 is connected to the drive recorders 2 mounted on the vehicles 20 through communication networks (e.g., wireless communication networks, wired communication networks, etc.). The traffic-jam information providing device 1 is a computer server (or a cloud server) which a public carrier aiming to provide traffic jam information to the drive recorders 2 mounted on the vehicles 20 may locate in its office building and connect to communication networks. A plurality of drive recorders 2 are mounted on a plurality of vehicles 20. In this connection, the vehicle 20 is one example of a moving object while the drive recorder 2 is one example of a sensing device configured to sense the moving object and its circumferential status. The drive recorder 2 equipped with a camera is configured to capture an image outside of the vehicle 20 and to transmit the image to the traffic jam information providing device 1.

Figure 2:
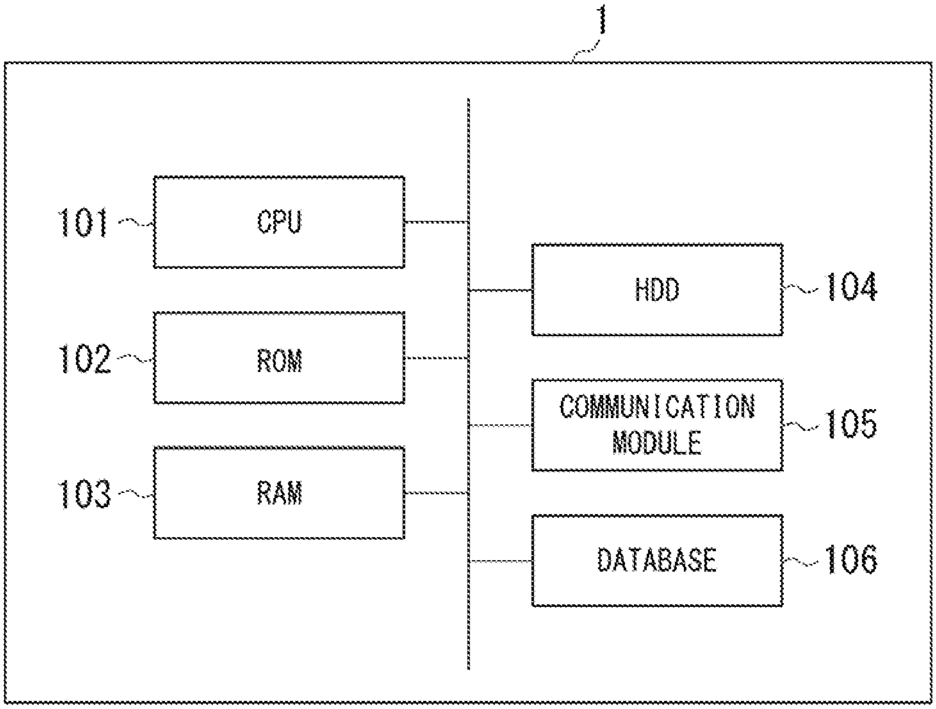
FIG. 2 is a hardware configuration diagram of the traffic-jam information providing device according to the exemplary embodiment of the present invention.

FIG. 2 is a hardware configuration diagram of the traffic-jam information providing device 1. The traffic jam information providing device 1 is configured of a computer including various hardware devices such as a CPU (Central Processing Unit) 101, a ROM (Read-Only Memory) 102, a RAM (Random-Access Memory) 103, an HDD (Hard-Disk Drive) 104, a communication module 105, and a database 106.

Figure 3:
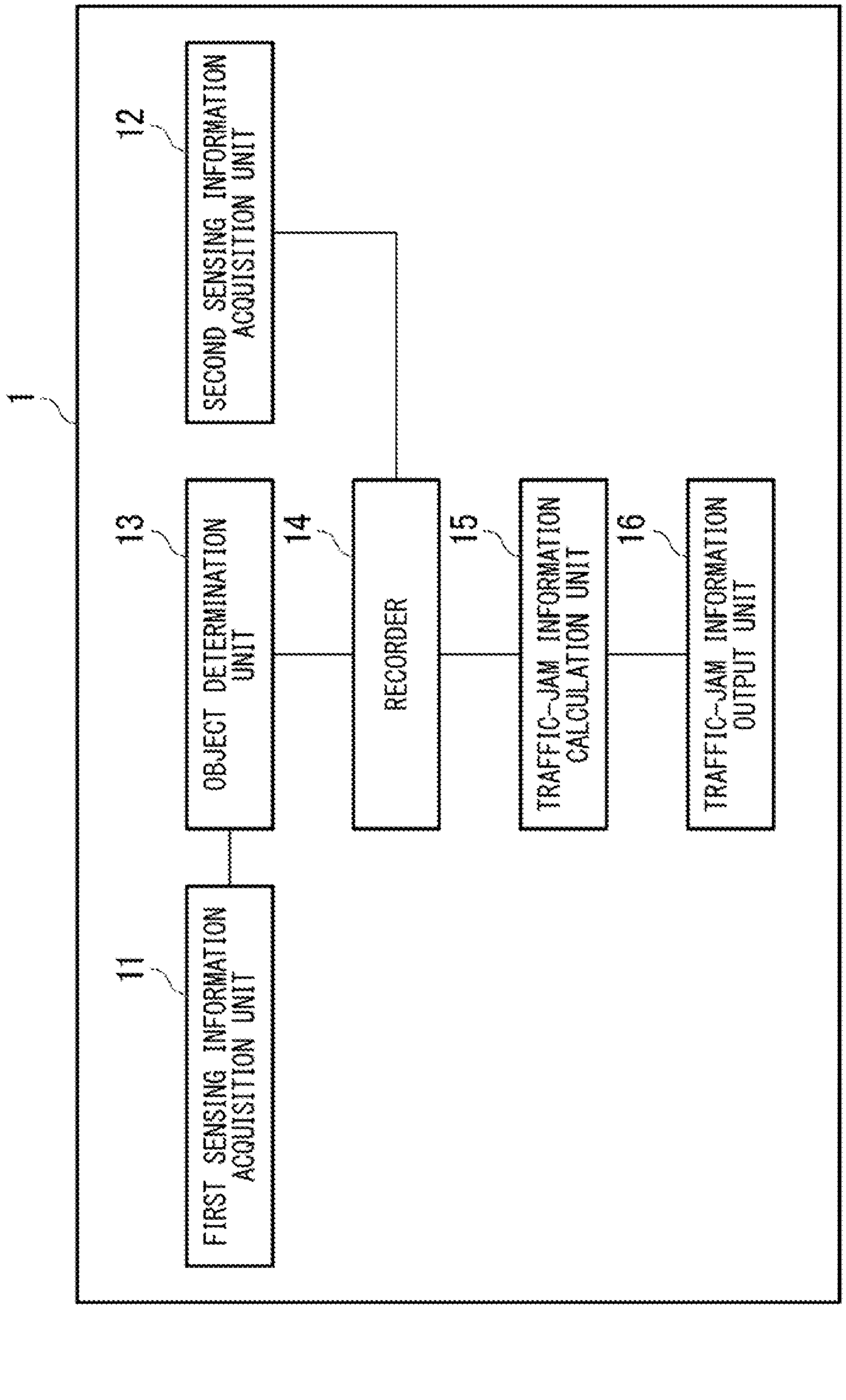
FIG. 3 is a functional block diagram of the traffic jam information providing device according to the exemplary embodiment of the present invention.

FIG. 3 is a functional block diagram of the traffic jam information providing device 1. Upon applying power, the traffic jam information providing device 1 may start its operation to execute traffic jam information providing programs pre-stored on storage media, thus achieving a plurality of functional units 11 through 16 shown in FIG. 3. That is, the traffic-jam information providing device 1 includes a first sensing information acquisition unit 11, a second sensing information acquisition unit 12, an object determination unit 13, a recorder 14, a traffic jam information calculation unit 15, and a traffic-jam information output unit 16.

The first sensing information acquisition unit 1 is configured to acquire first sensing information relating to the position of a target object causing a reduction of speed of the vehicle 20. For example, a target object causing a reduction of speed of the vehicle 20 would be road facilities such as signals, railway-crossings, intersections, signs, pedestrian crossings, stop lines, and bus stops. Other vehicles or persons (e.g., pedestrians, persons who may get on or off other vehicles, and workers) may be located in the vicinity of road facilities; hence, a driver should decelerate the vehicle 20 such that traffic congestion may be highly likely to occur on roads. The first sensing information acquisition unit 11 is configured to acquire from the drive recorder 2 the first sensing information relating to the position of a target object such as a signal, a railway-crossing, an intersection, a sign, a pedestrian crossing, a stop line, and a bus stop. The drive recorder 2 may receive signals including at least an object identifier and position information transmitted from a transmitter, which is located in the vicinity of a target object such as a signal, a railway-crossing, an intersection, a sign, a pedestrian crossing, a stop line, and a bus stop, as well as an identifier of the drive recorder 2, thus transmitting the first sensing information including the object identifier and the position information to the traffic jam information providing device 1. Accordingly, the first sensing information acquisition unit 11 may acquire the first sensing information from the drive recorder 2 mounted on the vehicle 20. That is, the first sensing information is used for the traffic jam information providing device 1 to grasp the position of a target object causing a reduction of speed of the vehicle 20.

The first sensing information acquisition unit 11 may acquire an image captured by the drive recorder 2 as the first sensing information. A target object such as a signal, a railway-crossing, an intersection, a sign, a pedestrian crossing, a stop line, and a bus stop may be possibly reflected in the captured image of the drive recorder 2. The captured image of the drive recorder 2 includes an identifier of the drive recorder 2 and the position information representing the place to capture an image by the drive recorder 2. For this reason, the traffic jam information providing device 1 is able to recognize the position of capturing an image including an image of a target object since the traffic-jam information providing deice 1 is configured to acquire the captured image of the drive recorder 2 as the first sensing information.

The second sensing information acquisition unit 12 is configured to acquire the second sensing information relating to the moving state of the vehicle 20. Specifically, the second sensing information includes various data which may allow the traffic-jam information providing device 1 to detect the speed of the vehicle 20 and an inter-vehicular distance between the vehicle 20 and its preceding vehicle. The second sensing information may include an image captured by the drive recorder 2 of the vehicle 20. When the second sensing information includes the captured image of the drive recorder 2, a plurality of images which are repeatedly captured over a lapse of time may reflect various images of objects (e.g., houses, trees, signs, and utility poles), and therefore the traffic jam information providing device 1 may estimate the speed of the vehicle 20 according to changing positions of objects. When the second sensing information includes the captured image of the drive recorder 2, the traffic jam information providing device 1 may estimate an interval of distance (or an inter-vehicular distance) between the vehicle 20 and its preceding vehicle according to the positional relationship with the preceding vehicle reflected in the captured image. That is, the speed of the vehicle 20 and the inter-vehicular distance with the preceding vehicle may be information relating to the moving state of the vehicle 20. The second sensing information may include the identifier of the drive recorder 2, time, and the position information representing the sensing position other than the information relating to the moving state of the vehicle 20.

The object determination unit 13 is configured to detect that the vehicle 20 is approaching a target object such as a signal, a railway-crossing, an intersection, a sign, a pedestrian crossing, a stop line, and a bus stop based on the first sensing information. Alternatively, the object determination unit 13 may detect the position of a target object approached by the vehicle 20. Upon detecting that the vehicle 20 is approaching a target object, the recorder 14 stores on the database 106 the second sensing information acquired from the drive recorder 2 of the vehicle 20 and annotated with an object-vicinity flag representing a decision to determine a target object. Accordingly, it is possible to store on the database 106 a flag as to whether or not the second sensing information is acquired in the vicinity of a target object such as a signal, a railway-crossing, an intersection, a sign, a pedestrian crossing, a stop line, and a bus stop.

The database 106 of the traffic-jam information providing device 1 stores a plurality of second sensing information acquired from a plurality of drive recorders 2 mounted on a plurality of vehicles 20, and therefore the traffic-jam information calculation unit 15 may calculate statistic values relating to positions of roads which the vehicles 20 are traveling along and the speed of vehicles 20 traveling through running sections based on a plurality of second sensing information. That is, the traffic jam information providing device 1 may calculate statistic values relating to the speed of multiple moving objects, whereas statistic values of the speed for each interval of sections for multiple moving objects are not necessarily average values. In this connection, a statistic value of the speed among the vehicles 20 may be an average speed for each vehicle 20. To calculate the average speed for each vehicle 20, the traffic jam information calculation unit 15 may calculate a path along which the vehicle 20 is moving based on the second sensing information, which is acquired in a section outside of a predetermined section with reference to the position of a target object determined based on the first sensing information, among a plurality of second sensing information. The average speed for each vehicle 20 and the path along which the vehicle 20 is moving may constitute the traffic jam information. Specifically, the traffic jam information calculation unit 15 may preclude the second sensing information annotated with an object-vicinity flag representing a decision to determine a target object such as a signal, a railway-crossing, an intersection, a sign, a pedestrian crossing, a stop line, and a bus stop among a plurality of second sensing information from a calculation of the average speed for each vehicle 20. Alternatively, the traffic jam information calculation unit 15 may preclude the second sensing information, which includes the position information of a predetermined section with reference to the position information included in the second sensing information annotated with an object-vicinity flag, from a calculation of the average speed for each vehicle 20.

The traffic jam information output unit 16 is configured to generate traffic jam output information based on the average speed for each vehicle 20 calculated by the traffic jam information calculation unit 15. The traffic jam output information may include at least the road information and the map information representing a road section in which traffic congestion can be estimated to occur since the average speed for each vehicle 20 traveling along roads becomes equal to or less than a predetermined threshold value. The traffic jam information output unit 16 may determine whether or not a traffic congestion occurs in a road based on the average speed for each vehicle 20 at a road position or a traveling section calculated by the traffic jam information calculation unit 15 and the relative speed deviated from the limit speed (e.g., upper-limit speed or lower-limit speed) indicated by a sign installed at the road position or the traveling section.

Figure 4:
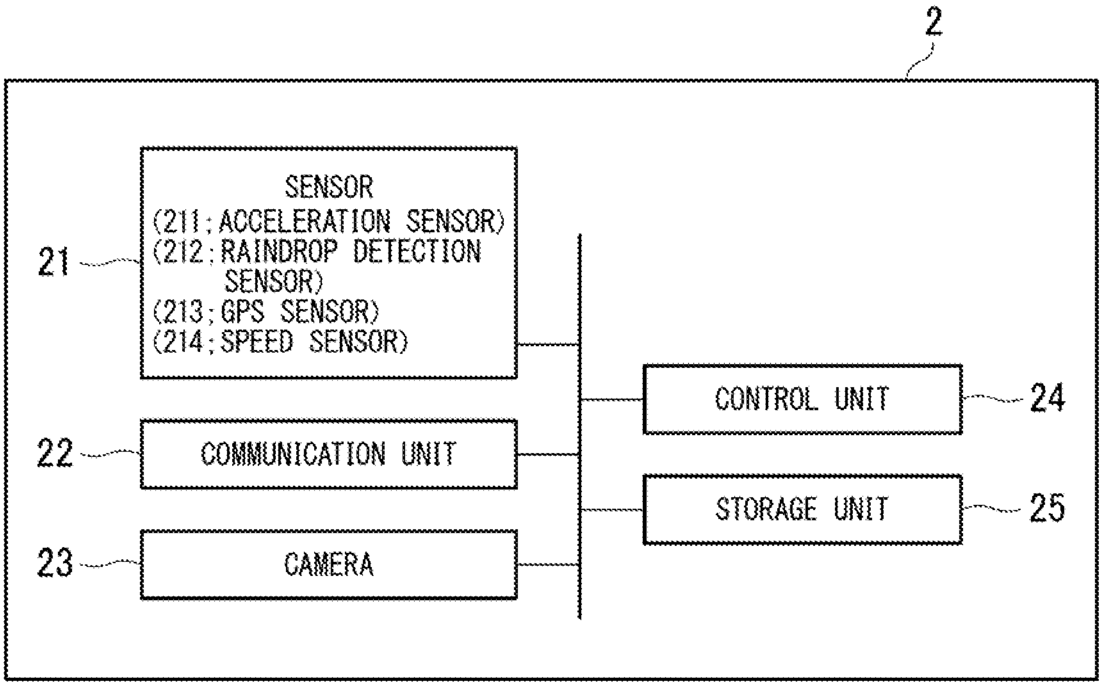
FIG. 4 is a hardware configuration diagram of a drive recorder mounted on a vehicle which communicates with the traffic jam information providing device according to the exemplary embodiment of the present invention.

FIG. 4 is a hardware configuration diagram of the drive recorder 2 mounted on the vehicle 20. The drive recorder 2 includes a sensor 21, a communication unit 22, a camera 23, a control unit 24, and a storage unit 25. The sensor 21 may include an acceleration sensor 211, a raindrop detection sensor 212, a GPS (Global Positioning System) 213, or a speed sensor 214. The sensor 21 may be a sensing device which can communicate with the drive recorder 2 and which is located at a predetermined position outside of the drive recorder 2 inside the vehicle 20. In this case, the drive recorder 2 is configured to acquire the sensing information detected by the sensor 21. The acceleration sensor 211 is configured to detect acceleration of the vehicle 20. The raindrop detection sensor 212 is configured to detect the presence/absence of raindrops hitting a windshield of the vehicle 20. The GPS sensor 213 is configured to detect the current position of the vehicle 20 (e.g., a latitude, a longitude, and an altitude) upon receiving radio waves coming from artificial satellites.

The communication unit 22 is configured to communicate with the traffic-jam information providing device 1 using a public-line communication function via exchanges and base stations. In addition, the communication unit 22 may receive signals from a transmitter which is located in the vicinity of a target object such as a signal, a railway-crossing, an intersection, a sign, a pedestrian crossing, a stop line, and a bus stop. The camera 23 is configured to capture a sight ahead of the vehicle 20. The camera 23 equipped with a wide-range lens may capture a sight on the left-side or the right-side of the vehicle 20 in addition to a sight ahead of the vehicle 20. In addition, the camera 23 may capture an image of an interior state of the vehicle 20. In addition, the camera 23 is able to capture moving images. Alternatively, the camera 23 may repeatedly capture still images at time intervals.

The control unit 24 is configured to control the function of the drive recorder 2. The storage unit 25 is configured to store sensing information including still images and moving images captured by the camera 23 as well as the detected information of the sensor 21. The drive recorder 2 may communicate with the traffic jam information providing device 1 through communication networks, and therefore the drive recorder 2 may transmit to the traffic jam information providing device 1 the sensing information including still images and moving images captured by the camera 23, the detected information of the sensor 21, the present time, and the drive-recorder ID (identifier). In this connection, the control unit 24 of the drive recorder 2 is configured of a computer including a CPU, a ROM, a RAM, and the like.

Figure 5:
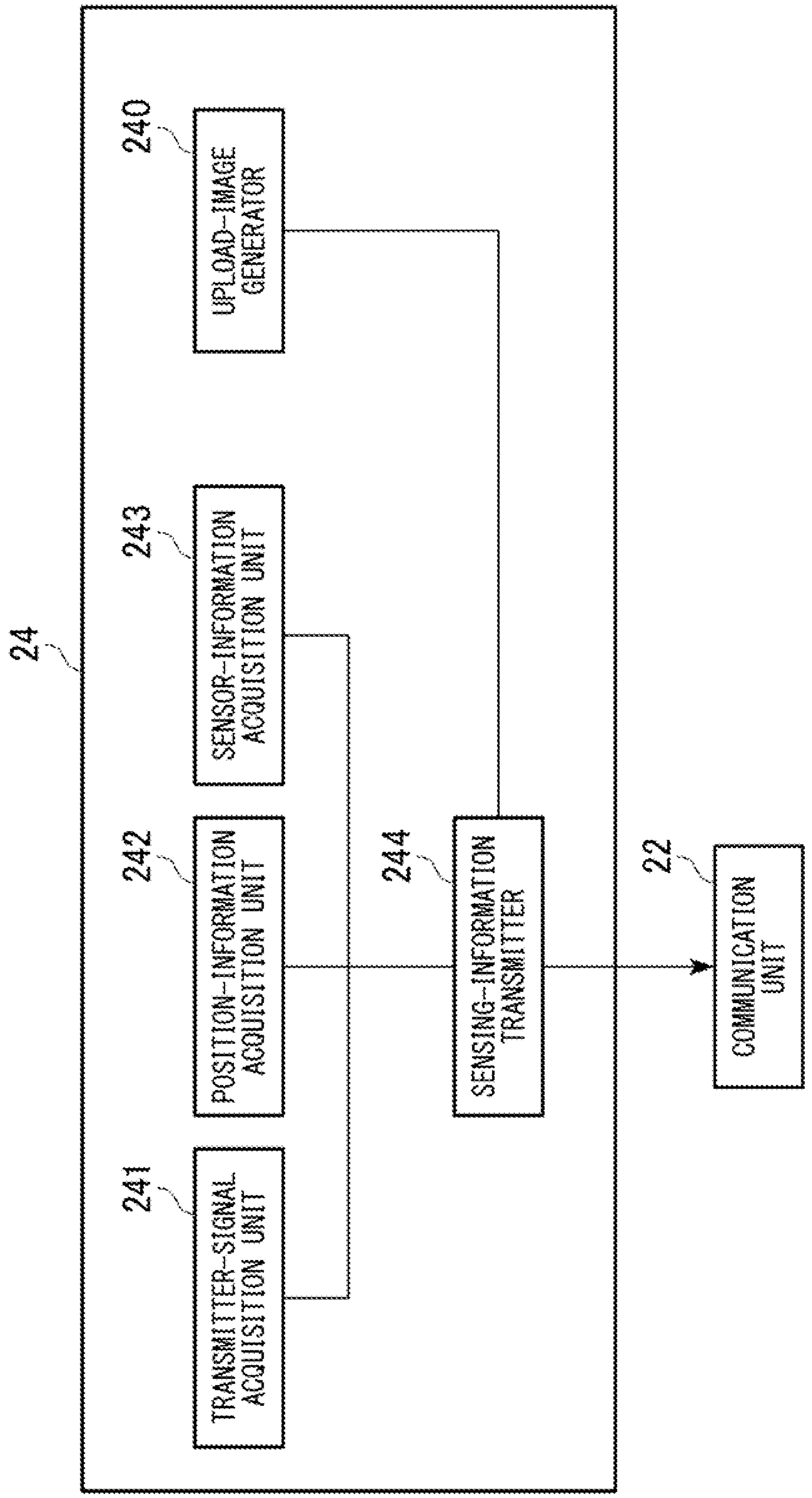
FIG. 5 is a functional block diagram of the drive recorder mounted on the vehicle.

FIG. 5 is a functional block diagram of the control unit 24 of the drive recorder 2. When the drive recorder 2 is activated, the control unit 24 starts to execute control programs, thus realizing a plurality of functional units 240 through 244. That is, the control unit 24 includes an upload-image generation unit 240, a transmitter-signal acquisition unit 241, a position-information acquisition unit 242, a sensor-information acquisition unit 243, and a sensing-information transmitter 244.

The upload-image generation unit 240 is configured to acquire image data representing moving images or still images captured by the camera 23 and to generate upload-captured images in a predetermined interval of time based on image data. For example, the upload-image generation unit 240 may generate an upload image as one through several tens of frames in each second (i.e., 1 through several tens of fps). The transmitter-signal acquisition unit 241 is configured to acquire object information included in signals transmitted by a transmitter located in the vicinity of a target object such as a signal, a railway-crossing, an intersection, a sign, a pedestrian crossing, a stop line and a bus stop.

The position-information acquisition unit 242 is configured to acquire position information (e.g., longitude information and latitude information) of the vehicle 20 with respect to time from the GPS sensor 213. The sensor-information acquisition unit 243 is configured to acquire sensor information detected by the acceleration sensor 211, the raindrop detection sensor 212, the speed sensor 214, or other sensors.

The sensing information may include upload images generated by the upload-image generation unit 240, the object information acquired by the transmitter-signal acquisition unit 241, the sensor information acquired by the sensor-information acquisition unit 243, an ID of the drive recorder 2, the current time, and the like, and therefore the sensing-information transmitter 244 may transmit the sensing information to the communication unit 22. In this connection, the sensing information includes first sensing information relating to the position of a target object causing a reduction of speed of the vehicle 20 and second sensing information relating to the moving state of the vehicle 20.

For example, it is possible to detect the position information of a target object reflected in an upload image, and therefore the upload image may serve as the first sensing information relating to the position of a target object causing a reduction of speed of the vehicle 20. It is possible to confirm the position information of a target object based on the object information included in signals transmitted by a transmitter located in the vicinity of a target object such as a signal, a railway-crossing, an intersection, a sign, a pedestrian crossing, a stop line, and a bus stop, and therefore the object information may serve as the first sensing information relating to the position of a target object causing a reduction of speed of the vehicle 20.

The position information acquired by the position-information acquisition unit 242 represents the traveling position of the vehicle 20 while the sensor information acquired by the sensor-information acquisition unit 243 represents the moving state of the vehicle 20 to be detected by the acceleration sensor 211, the raindrop detection sensor 212, the speed sensor 214, or other sensors, and therefore the position information and the sensor information may serve as the second sensing information relating to the moving state of the vehicle 20. In addition, it is possible to estimate an inter-vehicular distance between the vehicle 20 and its preceding vehicle using upload images while it is possible to estimate the speed of the vehicle 20 according to the transition of the positions of other objects reflected in multiple images, and therefore the upload image(s) may serve as the second sensing information.

The sensing-information transmitter 244 may individually transmit the first sensing information and the second sensing information to the communication unit 22. In this case, the sensing-information transmitter 244 may store the ID of the drive recorder 2 and the transmission time of the sensing information in the first sensing information and the second sensing information. Accordingly, it is possible for the traffic jam information providing device 1 to grasp the relationship between the first sensing information and the second sensing information. When upload images are used as the first sensing information relating to the position of a target object causing a reduction of speed of the vehicle 20, the control unit 24 may not necessarily require the object information included in signals transmitted by a transmitter located in the vicinity of a target object; hence, the control unit 24 does not need to include the transmitter-signal acquisition unit 241.

Figure 6:
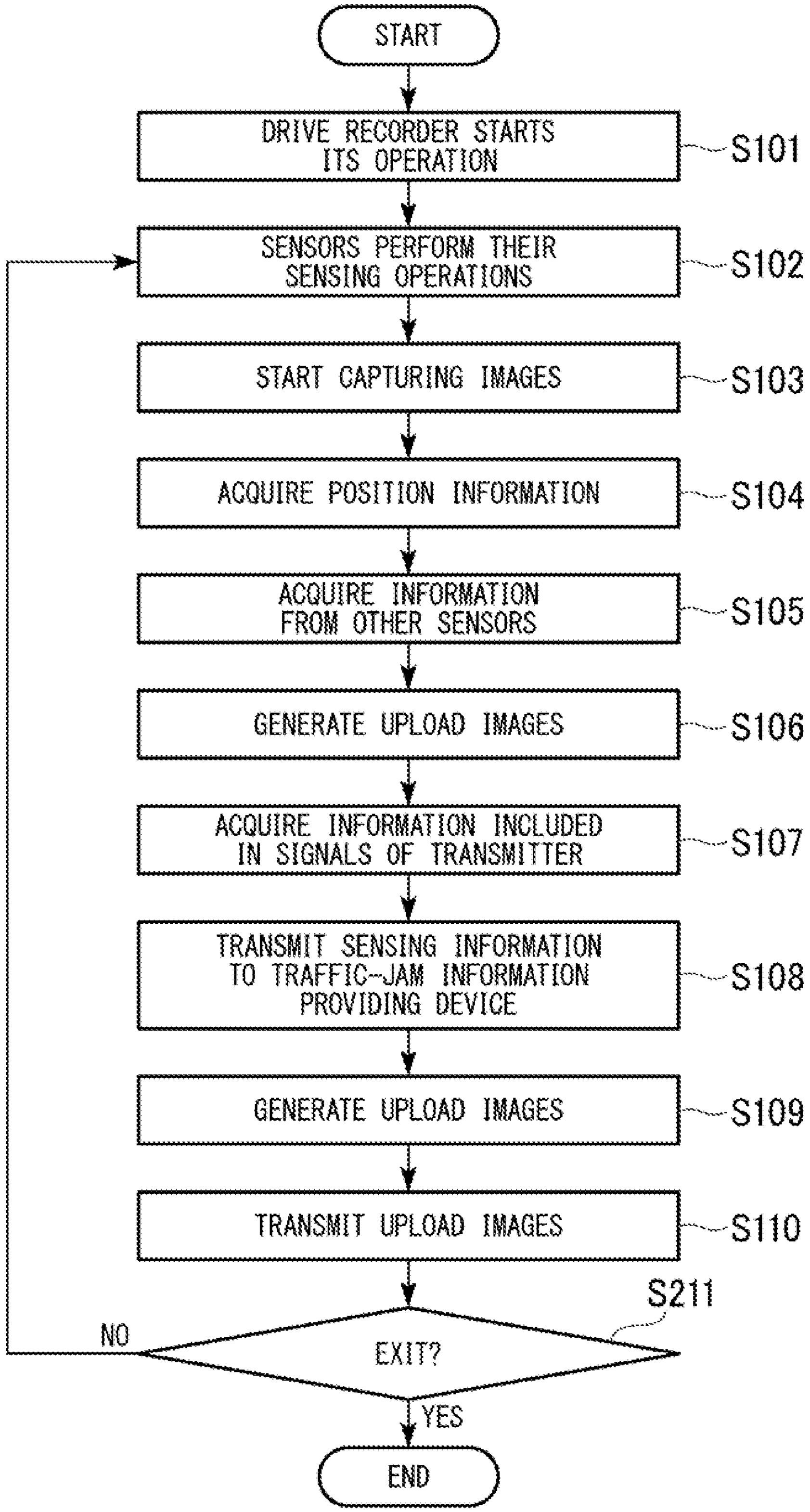
FIG. 6 is a flowchart showing an information processing procedure of the drive recorder mounted on the vehicle.

FIG. 6 is a flowchart showing an information processing procedure of the drive recorder 2. Next, the information processing of the drive recorder 2 (i.e., a procedure relating to the sensing information and the upload image(s)) will be described below (i.e., steps S101 through S110, step S211).

When an in-vehicle electric system starts to operate in the vehicle 20, the drive recorder 2 starts its operation (S101). A plurality of sensors 21 installed in the drive recorder 2 may start their operations after the drive recorder 2 starts its operation (S102). In addition, the camera 23 starts to capture an external sight of the vehicle 20 (S103). During the operation of the drive recorder 2, the functional units 240 through 244 of the control unit 24 may execute the aforementioned operations, and therefore the position-information acquisition unit 242 acquires the position information of the vehicle 20 (S104). The sensor-information acquisition unit 243 acquires the detected information of the sensor(s) 21 (S105). The upload-image generation unit 240 generates upload images based on the captured images of the camera 23 (S106). Upon receiving signals transmitted by a transmitter located in the vicinity of a target object such as a signal, a railway-crossing, an intersection, a sign, a pedestrian crossing, a stop line, and a bus stop, the transmitter-signal acquisition unit 241 acquires the object information included in signals (S107).

The sensing-information transmitter 244 acquires upload images from the upload-image generation unit 240, the object information included in signals of a transmitter from the transmitter-signal acquisition unit 241, the position information representing the current position of the vehicle 20 from the position-information acquisition unit 242, and the detection information of the sensor(s) 21 from the sensor-information acquisition unit 243. The sensing information includes the ID of the drive recorder 2 and the present time in addition to the upload images, the object information, the position information, and the detection information. The sensing-information transmitter 244 transmits the sensing information to the communication unit 22, and then the communication unit 22 transmits the sensing information to the traffic-jap information providing device 1 (S108). As described above, the sensing information includes the first sensing information relating to the position of a target object causing a reduction of speed of the vehicle 20 and the second sensing information relating to the moving state of the vehicle 20. In this connection, the sensing-information transmitter 244 may individually generate the first sensing information and the second sensing information so as to transmit the first and second sensing information to the communication unit 22, and then the communication unit 22 may individually transmit the first sensing information and the second sensing information to the traffic jam information providing device 1. The aforementioned sensing information will be transmitted to the traffic jam information providing device 1 since the drive recorder 2 mounted on the vehicle 20 communicates with the traffic jam information providing device 1. The traffic jam information providing device 1 may repeatedly receive a plurality of sensing information from the drive recorders 2 mounted on the vehicles 20.

The drive recorder 2 may generate upload images based on image data such as moving images and still images captured by the camera 23 (S109) so as to transmit upload images to the traffic-jam information providing device 1 via the communication unit 22 (S110). Upon completion of transmitting sensing information and upload images, the drive recorder 2 exits the procedure of FIG. 6 (S211).

Figure 7:
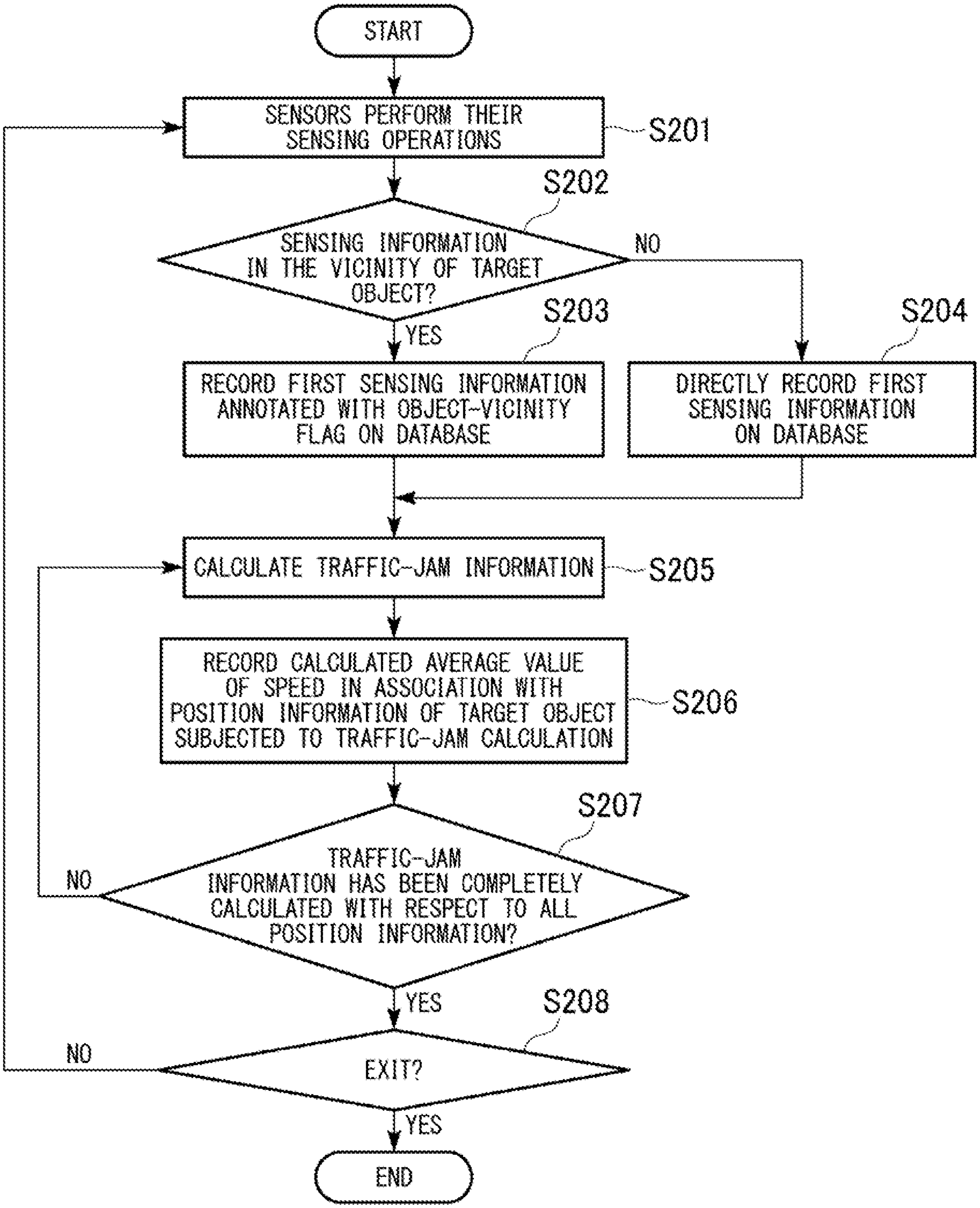
FIG. 7 is a flowchart showing a traffic jam information calculating process of the traffic jam information providing device according to the exemplary embodiment of the present invention.

FIG. 7 is a flowchart showing a traffic jam information calculating process of the traffic jam information providing device 1 according to the exemplary embodiment of the present invention (i.e., steps S201 through S208). In the traffic jam information providing device 1, the first sensing information acquisition unit 11 and the second sensing information acquisition unit 12 are configured to acquire their sensing information. The first sensing information acquisition unit 11 extracts the first sensing information included in the sensing information while the second sensing information acquisition unit 12 extracts the second sensing information included in the sensing information. When the drive recorder 2 individually transmits the first sensing information and the second sensing information to the traffic jam information providing device 1, the first sensing information acquisition unit 11 acquires the first sensing information while the second sensing information acquisition unit 12 acquires the second sensing information. In this connection, both the first sensing information and the second sensing information include the ID of the drive recorder 2, the position information, and the time information. For this reason, the first sensing information and the second sensing information are mutually related to each other.

The first sensing information acquisition unit 11 transmits captured images (e.g., moving images, still images, etc.) or the object information included in the first sensing information to the object determination unit 13. Upon inputting captured images from the first sensing information acquisition unit 11, the object determination unit 13 determines using the captured images whether or not the first sensing information and the second sensing information are each detected in the vicinity of a target object (S202). Specifically, the object determination unit 13 determines whether or not a target object is included in captured images according to image recognition. The object determination unit 13 has an object determination model which is generated via machine learning of past sensing information, and therefore the object determination unit 13 may determine the presence/absence of a target object in captured images according to the determination result of a target object which is obtained by inputting captured images into the object determination model. Upon determining that a target object (e.g., a signal, a railway-crossing, an intersection, a sign, a pedestrian crossing, a stop line, and a bus stop) causing a reduction of speed of the vehicle 20 is included in captured images, the object determination unit 13 extracts the ID of the drive recorder 2, the position information, and the time information from the first sensing information including captured images, thus records them on the recorder 14. In addition, the recorder 14 inputs the second sensing information from the second sensing information acquisition unit 12.

Upon acquiring the object information from the first sensing information acquisition unit 11, the object determination unit 13 may determine whether or not the first sensing information and the second sensing information are each detected in the vicinity of a target object based on the object information. Upon acquiring the object information, the object determination unit 13 may determine that the first sensing information and the second sensing information have been detected in the vicinity of a target object.

The object determination unit 13 may determine that the first sensing information and the second sensing information have been detected in the vicinity of a target object based on the position information included in the first sensing information. For example, the object determination unit 13 extracts the position information included in the first sensing information so as to send an object-presence/absence determination request including the position information to a determination unit (not shown). The determination unit stores the map information and the position information of a target object on the map indicated by the map information in advance. Upon comparing the position information included in the object-presence/absence determination request with the prestored position information of a target object, the determination unit may determine that such position information may be located close to each other when the positions indicated by the position information are located within a predetermined range of distance. In this case, the determination unit sends back response information representing the presence of a target object. Upon receiving from the determination unit the response information representing the presence of a target object, the object determination unit 13 determines that the first sensing information and the second sensing information have been detected in the vicinity of a target object.

The recorder 14 determines whether or not a combination of the ID of the drive recorder 2, the position information, and the time information included in the second sensing information acquired from the second sensing information acquisition unit 12 matches a combination of the ID of the drive recorder 2, the position information, and the time information acquired from the object determination unit 13. Upon determining a match between those combinations each including the ID of the drive recorder 2, the position information, and the time information, the recorder 14 records on the database 106 the first sensing information annotated with an object-vicinity flag representing the determination result of the presence of a target object (S203). Upon determining no match between those combinations each including the ID of the drive recorder 2, the position information, and the time information, the recorder 14 directly records on the database 106 the first sensing information without being annotated with an object-vicinity flag representing the determination result of the presence of a target object (S204). In this connection, the first sensing information annotated with the determination result of the presence of a target object is acquired by the drive recorder 2 in the vicinity of a target object causing a reduction of speed of the vehicle 20. As to a match determination between combinations each including the ID of the drive recorder 2, the position information, and the time information, the recorder 14 may substantially determine a match between combinations each including the ID of the drive recorder 2, the position information, and the time information irrespective of a subtle difference of the position information and the time information which may fall within a predetermined threshold range.

According to the aforementioned process, the recorder 14 will sequentially record on the database 106 a series of first sensing information transmitted from the drive recorders 2 mounted on the vehicles 20 or a series of first sensing information each annotated with an object-vicinity flag representing the determination result of the presence of a target object. Due to an increasing number of drive recorders 2 each transmitting its sensing information to the traffic jam information providing device 1 via communication, the recorder 14 may record a large number of first sensing information, and therefore a plurality of sensing information detected at multiple points will be recorded on the database 106.

The traffic jam information calculation unit 15 is configured to calculate traffic-jam information on the condition that the first sensing information and the second sensing information have been stored on the database 106 (S205). The traffic jam information calculation unit 15 is configured to store a plurality of position information with respect to objects subjected to traffic jam calculations on roads shown by the map information. For example, the traffic jam information calculation unit 15 is configured to store a plurality of position information with respect to objects subjected to traffic jam calculations which are set to roads all over a metropolitan area or all over Japan. Upon reading out the position information with respect to objects subjected to traffic jam calculations, the traffic jam information calculation unit 15 is configured to extract from a plurality of second sensing information stored on the database 106 one or multiple second sensing information each of which does not include an object-vicinity flag but each of which includes position information representing a position to be deviated from the read position information within a predetermined range of distance (e.g., ten-meters distance or twenty-meters distance) and time information representing time preceding the current time by a predetermined time (e.g., one minute). Subsequently, the traffic jam information calculation unit 15 is configured to obtain speed values included in one or multiple second sensing information extracted from the database 106, thus calculating an average value from speed values. The traffic jam information calculation unit 15 is configured to store on the database 106 the position information of an object subjected to traffic jam calculation in association with an average value of speed values included in the second sensing information (S206). Thereafter, the traffic-jam information calculation unit 15 is configured to determine whether the traffic-jam information has been produced with respect to all the position information of objects subjected to traffic-jam calculations which are stored in advance (S207). The traffic-jam information calculation unit 15 is configured to repeatedly calculate the traffic jam information with respect to all the position information of objects subjected to traffic jam calculations (S205 through S207). Thereafter, the traffic jam information calculation unit 15 will calculate the traffic jam information with respect to all the position information of objects subjected to traffic jam calculations, thus determining whether to exit the traffic-jam information calculating process (S208). When the traffic jam information calculation unit 15 does not exit the traffic jam information calculating process, the flow returns to step S201 such that the traffic jam information calculation unit 15 will repeatedly calculate the traffic jam information with respect to all the position information of objects subjected to traffic jam calculations in a predetermined interval of time. Accordingly, it is possible for the traffic-jam information providing device 1 to update the average speed of vehicles 20 in real time with respect to all the position information of objects subjected to traffic jam calculations.

The aforementioned traffic jam information calculating process is configured to calculate the average speed of the vehicles 20 using the second sensing information not annotated with an object-vicinity flag at the position indicated by the position information of objects subjected to traffic jam calculations. In other words, the average speed of vehicles 20 is calculated by precluding the second sensing information which is obtained at the position confirming the presence of a target object causing a reduction of speed of the vehicle 20; hence, it is possible to calculate the average speed of vehicles 20 by precluding an impact of traffic congestion which may occur due to a target object causing a reduction of speed of the vehicle 20. Accordingly, it is possible to calculate the traffic-jam information with high accuracy.

In the aforementioned traffic jam information calculating process, the traffic-jam information providing device 1 stores the position information of an object subjected to traffic jam calculation in advance so as to calculate the average speed of vehicles 20 at the position indicated by the position information; but this is not a restriction. For example, the traffic jam information providing device 1 may store objects subjected to traffic jam calculations in multiple sections divided from roads in advance, thus calculating the average speed of vehicles 20 at the position included in each section.

In addition, the traffic jam information calculation unit 15 may calculate the traffic jam information representing the presence/absence of traffic congestion based on the captured image of the drive recorder 2. For example, the traffic jam information calculation unit 15 may acquire the position information of an object subjected to traffic-jam calculation stored in advance so as to extract from a plurality of second sensing information stored on the database 106 one or multiple second sensing information each of which does not include an object-vicinity flag but each of which includes position information to be deviated from the acquired position information within a predetermined range of distance (e.g., ten-meters distance or twenty-meters distance) and time information preceding the current time by a predetermined time (e.g. one minute). Subsequently, the traffic jam information calculation unit 15 may acquire the captured image included in the second sensing information extracted from the database 106. The traffic jam information calculation unit 15 may determine whether or not an inter-vehicular distance between the vehicle 20 and its preceding vehicle is below a predetermined threshold value based on the captured image. As a method to determine whether or not an inter-vehicular distance between the vehicle 20 and its preceding vehicle reflected in the captured image is below a predetermined threshold value, for example, it is possible to determine the presence/absence of the preceding vehicle by recognizing a rear shape of an object reflected in the captured image and to thereby determine whether or not an inter-vehicular distance is below a predetermined threshold value with reference to an imaging range of the preceding vehicle reflected in the captured image. Alternatively, the traffic jam information calculation unit 15 has a distance-determination model, which has been obtained by machine learning of images captured in the past, and therefore the captured image of the drive recorder 2 is input to the distance-determination model so as to produce the determination result as to whether or not an inter-vehicular distance is below a predetermined threshold value.

In the aforementioned traffic jam information calculating process, the recorder 14 may store on the database 106 the second sensing information annotated with a weather flag other than an object-vicinity flag. In this connection, the weather flag indicates that the sensing information is not suited to traffic jam information calculation. The recorder 14 is configured to determine whether or not the second sensing information is suited to traffic jam information calculation based on the captured image included in the second sensing information and/or the detection value of the raindrop detection sensor 212 since the second sensing information is detected under unfavorable running environments (e.g., running environments below a predetermined threshold value meeting external-environment detection standards due to unfavorable weather or an unfavorable road status). Specifically, the recorder 14 may store the second sensing information annotated with a weather flag on the database 106 upon determining unfavorable weather based on the captured image or upon determining unfavorable weather based on the detection value of the raindrop detection sensor 212 indicating heavy rain. Subsequently, the traffic jam information calculation unit 15 may calculate the traffic jam information based on the second sensing information precluding the second sensing information annotated with a weather flag.

The traffic jam information output unit 16 is configured to generate traffic jam output information using the traffic jam information calculated by the traffic jam information calculation unit 15. Specifically, the traffic jam information output unit 16 inputs a plurality of position information representing a predetermined map area. For example, the traffic-jam information output unit 16 may input a plurality of position information from an external device. In this connection, the drive recorder 2 may serve as an external device. The traffic jam information output unit 16 is configured to acquire the average speed of vehicles 20 at the position information of an object subjected to traffic jam calculation recorded on the database 106 in advance with reference to a plurality of position information which falls within a predetermined map area. Subsequently, the traffic jam information output unit 16 may compare the average speed at the position information with the minimum speed displayed on a road sign indicated by the position information. The traffic jam information output unit 16 may estimate a degree of traffic congestion at the position information according to a difference between the average speed and the minimum speed when the average speed at the position information is less than the minimum speed.

Specifically, the traffic-jam information output unit 16 determines a degree of traffic congestion as "Low" when an average speed va of vehicles is less than a minimum speed vl while a difference D between the average speed va and the minimum speed vl is less than a first threshold value la (where va<vl, D<la). In addition, the traffic-jam information output unit 16 determines a degree of traffic congestion as "Intermediate" when the average speed va is less than the minimum speed vl while the difference D is above the first threshold value la but less than a second threshold value lb higher than the first threshold value la (where va<vl, la≤D<lb). Moreover, the traffic jam information output unit 16 determines a degree of traffic congestion as "High" when the average speed va is less than the minimum speed vl while the difference D is above the second threshold value lb but less than a third threshold value lc (where va<vl, lb≤D<lc). In this connection, the traffic-jam information calculation unit 15 may calculate a degree of traffic congestion according to the aforementioned processes.

The traffic jam information providing device 1 may store the minimum speed indicated by a road sign based on the position information included in the second sensing information. Alternatively, the traffic-jam information output unit 16 may carry out an image recognition of the captured image included in the second sensing information, thus detecting the minimum speed indicated by a road sign. In this connection, the traffic-jam information output unit 16 may calculate a degree of traffic congestion using the maximum speed indicated by a road sign instead of the minimum speed indicated by a road sign.

In the above, a road sign may show the maximum speed rather than the minimum speed. Using a limit speed (or the maximum speed) vh indicated by a road sign, it is possible to determine a degree of traffic congestion as "Low" when vehicles seem to be smoothly running on roads when the average speed va of vehicles is below the limit speed vh while a difference Dh between the average speed va and the limit speed vh is less than a predetermined threshold value ld (i.e., a threshold value used for determining a degree of traffic congestion) (where Dh<ld). In addition, it is possible to determine a degree of traffic congestion as "High" when vehicles seem to be running at low speed when the difference Dh is above the predetermined threshold value ld (where Dh≥ld).

Subsequently, the traffic jam information output unit 16 is configured to calculate a degree of traffic congestion with respect to a plurality of position information relating to a plurality of objects subjected to traffic jam calculations included in a map area input from an external device, thus outputting the degree of traffic congestion to the external device. At this time, the traffic jam information output unit 16 may introduce the grouping using different colors according to degrees of traffic congestion at various positions of roads in a map area so as to generate the map information separated by different colors representing degrees of traffic congestion as the traffic jam output information, thus outputting the traffic jam output information to the external device. Accordingly, the external device may output the map information representing degrees of traffic congestion on a monitor or the like.

According to the aforementioned processes, the traffic jam information providing device 1 is able to generate the traffic jam output information with high accuracy and to provide the traffic jam output information to an external device (or a traffic jam information output device). In the aforementioned processes, the traffic jam information providing device 1 configured to calculate the traffic jam information is located at a remote place from the vehicle 20 configured to communicate with the drive recorder 2. However, it is possible to install the function of the traffic-jam information providing device 1 in an in-vehicle device configured to communicate with the drive recorder 2.

In the aforementioned processes, the average speed of vehicles at the position information of roads is calculated using speed values included in the second sensing information; but this is not a restriction. For example, the traffic jam information calculation unit 15 may calculate the speed of the vehicle 20 equipped with the drive recorder 2 configured to transmit the second sensing information by applying the optical-flow technique (i.e., a technique for analyzing motion vectors of objects reflected in digital images) to the captured image included in the second sensing information, thus producing the average speed of vehicles.

In the aforementioned processes, the traffic jam information calculation unit 15 may calculate a degree of traffic congestion based on the number of other vehicles running in the vicinity of the vehicle 20 in addition to the sensing information and the captured image of the drive recorder 2. Subsequently, the traffic-jam information output unit 16 may generate the traffic jam output information based on a degree of traffic congestion which is calculated based on the number of other vehicles running in the vicinity of the vehicle 20. Specifically, the traffic-jam information calculation unit 15 counts the number of other vehicles running in the vicinity of the vehicle 20, which is included in the second sensing information. The occurrence of traffic congestion may increase the number of other vehicles running in the vicinity of the vehicle 20. For this reason, the traffic jam information calculation unit 15 may calculate a degree of traffic congestion according to a predetermined process responsive to the number of other vehicles reflected in captured images. Alternatively, the traffic jam information calculation unit 15 or the traffic jam information output unit 16 may calculate a degree of traffic congestion according to a predetermined traffic-congestion calculating equation using a plurality of parameters such as the average speed and the number of vehicles at position information and the type of roads.

As described above in conjunction with the procedure of processing of the traffic jam information providing device 1, the traffic jam information providing device 1 is configured to calculate the average speed of vehicles at the position information using the second sensing information not including an object-vicinity flag. That is, the traffic jam information providing device 1 is configured to calculate the average speed of vehicles using the second sensing information precluding the second sensing information acquired in the vicinity of a target object causing a reduction of speed of the vehicle 20, and therefore it is possible to calculate the average speed of vehicles precluding an impact of traffic congestion which may occur due to the presence of a target object. Accordingly, it is possible for the traffic jam information providing device 1 to calculate the traffic jam information with high accuracy. In addition, it is possible to reduce an erroneous detection to determine the occurrence of traffic congestion immediately upon detecting a reduction of speed due to the presence of a target object causing a reduction of speed of the vehicle 20.

According to the aforementioned processes, it is possible for the traffic jam information providing device 1 to calculate the traffic jam information based on the object information and the captured image obtained from the drive recorder 2. That is, the traffic jam information providing device 1 configured to automatically calculate the traffic jam information may eliminate the necessity of measuring traffic congestion on roads using human labor, thus reducing the cost for calculating the traffic-jam information. In addition, the traffic jam information providing device 1 is able to calculate the traffic jam information using the sensing information measured at each point on roads which the vehicle 20 has passed through; hence, it is possible to calculate the traffic jam information at many points such as narrow municipal roads in urban areas without entailing costs.

According to the aforementioned processes, the traffic jam information providing device 1 is configured to calculate the traffic jam information at many points in a short period of time, thus providing detailed traffic-jam information in real time.

Figure 8:
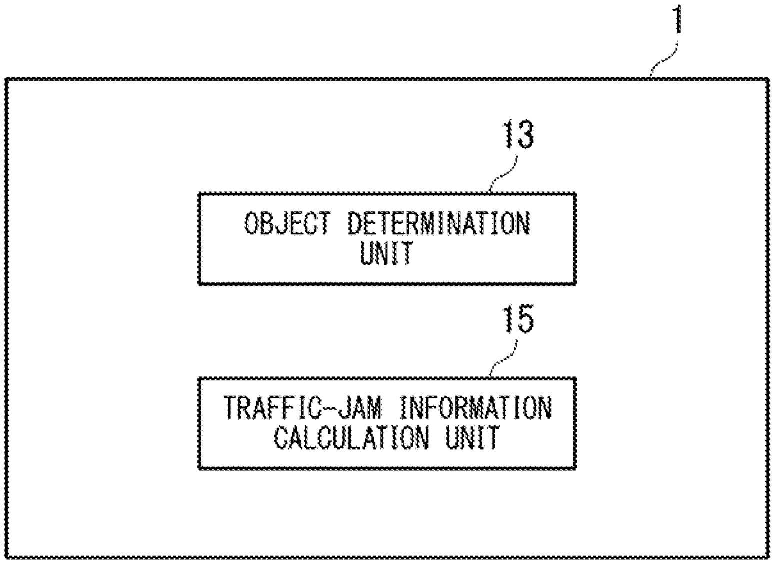
FIG. 8 is a block diagram showing the minimum configuration of the traffic jam information providing device according to non-limiting embodiments of the present invention.
Figure 9:
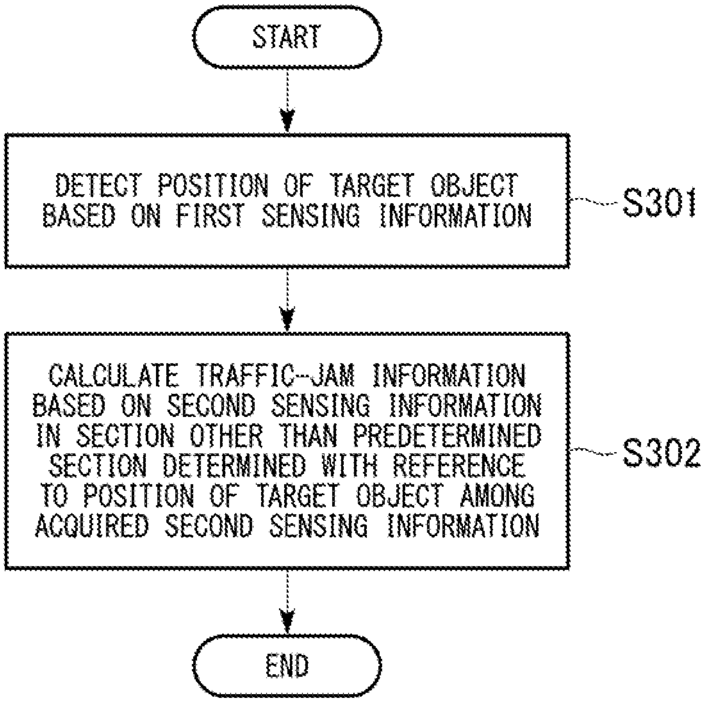
FIG. 9 is a flowchart showing a traffic jam information calculating process of the traffic jam information providing device shown in FIG. 8.

FIG. 8 is a block diagram showing the minimum configuration of the traffic jam information providing device 1. The traffic jam information providing device 1 includes at least the object determination unit 13 and the traffic jam information calculation unit 15. FIG. 9 is a flowchart showing a traffic jam information calculating process of the traffic jam information providing device 1 of FIG. 8 (i.e., steps S301, S302). The object determination unit 13 is configured to detect the position of a target object (e.g., a signal, a railway-crossing, an intersection, a sign, a pedestrian crossing, a stop line, and a bus stop facilitated on roads) based on the first sensing information representing the position of a target object causing a reduction of speed of a moving object (e.g., a vehicle) (S301). Herein, a plurality of sections is set to a path which a moving object is moving along; hence, a target object detected based on the first sensing information should belong to a predetermined section. Next, the traffic jam information calculation unit 15 calculates the traffic-jam information relating to a path which a moving object is moving along based on the second sensing information, which is detected in a certain section precluding a predetermined section determined with reference to the position of a target object detected based on the first sensing information, among a plurality of second sensing information relating to the moving status of a moving object (e.g., the running speed of a vehicle) (S302).

The aforementioned devices incorporate computer systems therein. The aforementioned processes are stored on computer-readable storage media as programs, and therefore a computer may read and execute programs to achieve the aforementioned processes. Herein, computer-readable storage media refer to magnetic disks, magneto-optical disks, CD-ROM, DVD-ROM, semiconductor memory, or the like. In addition, it is possible to distribute programs to a computer through communication lines, and therefore the computer may execute programs.

The aforementioned programs may achieve some of the aforementioned functions. Alternatively, the aforementioned programs may be differential programs (or differential files) which can be combined with pre-installed programs, which were already stored on a computer system, so as to achieve the aforementioned functions.

Lastly, the present invention is not necessarily limited to the foregoing embodiment; hence, the present invention may include any modifications or design changes in terms of the configurations and functions of the foregoing embodiment without departing from the subject matter of the invention as defined in the appended claims.

The present application claims the benefit of priority on Japanese Patent Application No. 2019-77226 filed on Apr. 15, 2019, the subject matter of which is hereby incorporated herein by reference.

INDUSTRIAL APPLICABILITY

In the foregoing embodiment, the traffic jam information providing device is designed to calculate the traffic jam information according to the speed and the position of a vehicle traveling on roads; however, it is possible to detect the position and speed of moving objects other than the vehicle, to estimate the presence of a target object causing a reduction of speed of moving objects, and to thereby calculate the traffic jam information with respect to a plurality of moving objects.

REFERENCE SIGNS LIST

1 traffic-jam information providing device
2 drive recorder
11 first sensing information acquisition unit (first sensing information acquisition means)
12 second sensing information acquisition unit (second sensing information acquisition means)
13 object determination unit (object determination means)
14 recorder (recording means)
15 traffic-jam information calculation unit (traffic-jam information calculation means)
16 traffic jam information output unit (traffic-jam information output means)
20 vehicle
21 sensor
22 communication unit
23 camera
24 control unit
25 storage unit

What is claimed is:

1. A traffic-jam information providing device, comprising:
a memory configured to store instructions; and
a processor configured to execute the instructions to:
determine a position of a target object based on first sensing information relating to the position of the target object causing a speed reduction of a moving object, the target object including at least one of a signal, a railway-crossing, an intersection, a sign, a pedestrian crossing, a stop line, and a bus stop; and
calculate traffic-jam information in a path which the moving object moves along based on second sensing information, wherein
the path has a plurality of sections,
the second sensing information relates to a moving status of the moving object in a section other than a predetermined section determined with reference to the position of the target object detected based on the first sensing information, and
the second sensing information is acquired in a time zone other than a time zone in which a running environment of the path is below a predetermined threshold value.

2. The traffic-jam information providing device according to claim 1, wherein the second sensing information represents speed of the target object moving along the path.

3. The traffic-jam information providing device according to claim 1, wherein the second sensing information represents an image captured by an imaging device mounted on the moving object.

4. The traffic-jam information providing device according to claim 1, wherein the processor is further configured to calculate a statistical value regarding speed values of a plurality of vehicles based on a plurality of second sensing information representing the speed values of the plurality of moving objects moving along the path.

5. A traffic-jam information processing method causing a computer to:
determine a position of a target object based on first sensing information relating to the position of the target object causing a speed reduction of a moving object, the target object including at least one of a signal, a railway-crossing, an intersection, a sign, a pedestrian crossing, a stop line, and a bus stop; and
calculate traffic-jam information in a path which the moving object moves along based on the second sensing information, wherein
the path has a plurality of sections,
the second sensing information relates to a moving status of the moving object in a section other than a predetermined section determined with reference to the position of the target object detected based on the first sensing information, and
the second sensing information is acquired in a time zone other than a time zone in which a running environment of the path is below a predetermined threshold value.

6. A non-transitory recording medium configured to store a program causing a computer to:
determine a position of a target object based on first sensing information relating to the position of the target object causing a speed reduction of a moving object, the target object including at least one of a signal, a railway-crossing, an intersection, a sign, a pedestrian crossing, a stop line, and a bus stop; and
calculate traffic-jam information in a path which the moving object moves along based on second sensing information, wherein
the path has a plurality of sections,
the second sensing information relates to a moving status of the moving object in a section other than a predetermined section determined with reference to the position of the target object detected based on the first sensing information, and
the second sensing information is acquired in a time zone other than a time zone in which a running environment of the path is below a predetermined threshold value.

* * * * *